United States Patent
Marx et al.

(10) Patent No.: US 12,552,362 B2
(45) Date of Patent: Feb. 17, 2026

(54) METHOD AND APPARATUS FOR COMPENSATING A YAW MOMENT ACTING ON A VEHICLE

(71) Applicant: ZF Active Safety GmbH, Koblenz (DE)

(72) Inventors: Andreas Marx, Hartenfels (DE); Nicholas Alford, Waldesch (DE)

(73) Assignee: ZF Active Safety GmbH, Koblenz (DE)

( * ) Notice: Subject to any disclaimer, the term of this patent is extended or adjusted under 35 U.S.C. 154(b) by 107 days.

(21) Appl. No.: 18/078,578

(22) Filed: Dec. 9, 2022

(65) Prior Publication Data
US 2023/0192069 A1    Jun. 22, 2023

(30) Foreign Application Priority Data
Dec. 20, 2021 (DE) .......................... 102021133882.4

(51) Int. Cl.
*B60W 30/02* (2012.01)
*B60W 10/184* (2012.01)
*B60W 10/20* (2006.01)

(52) U.S. Cl.
CPC .......... *B60W 30/02* (2013.01); *B60W 10/184* (2013.01); *B60W 10/20* (2013.01); *B60W 2510/18* (2013.01); *B60W 2510/20* (2013.01); *B60W 2520/14* (2013.01); *B60W 2710/207* (2013.01)

(58) Field of Classification Search
CPC .. B60W 10/184; B60W 10/192; B60W 10/20; B60W 30/02; B60W 30/045; B60W 2510/18; B60W 2510/20; B60W 2510/207; B60W 2520/14; B60W 2710/207; G05D 1/0061; G05D 1/0088; G05D 1/021; G05D 1/0214; G05D 1/0221; G05D 1/0223
See application file for complete search history.

(56) References Cited

U.S. PATENT DOCUMENTS

| | | | |
|---|---|---|---|
| 6,345,225 B1* | 2/2002 | Bohm | B60T 8/321 701/72 |
| 7,418,329 B2* | 8/2008 | Yasui | B60W 30/045 701/41 |
| 8,078,361 B2* | 12/2011 | Galkowski | B62D 6/003 701/41 |

FOREIGN PATENT DOCUMENTS

| | | |
|---|---|---|
| DE | 4038079 A1 | 6/1992 |
| DE | 19751227 A1 | 9/1998 |

(Continued)

*Primary Examiner* — Mark L. Greene
(74) *Attorney, Agent, or Firm* — Kristin L. Murphy (57) ABSTRACT

The disclosure relates to a method for compensating a yaw moment acting on a vehicle which is caused by asymmetrical braking forces on at least one vehicle axle. In the method, at least one vehicle-related condition is queried after initiation of a braking operation, a yaw variable present on the vehicle is detected, the value of the detected yaw variable is compared with a yaw variable limit value, a corrective steering angle is determined depending on the difference and/or the change in the difference between the value of the detected yaw variable and the yaw variable limit value, taking into account the sign of the yaw variable, and, lastly, a corrective steering angle is automatically set on at least one vehicle wheel of a steered vehicle axle. The disclosure also relates to an apparatus for compensating a yaw moment acting on a vehicle.

17 Claims, 4 Drawing Sheets

(56) References Cited

FOREIGN PATENT DOCUMENTS

DE 102004017845 A1 4/2005
DE 102007032174 A1 1/2008

* cited by examiner

METHOD AND APPARATUS FOR COMPENSATING A YAW MOMENT ACTING ON A VEHICLE

CROSS-REFERENCE TO RELATED APPLICATION

This application claims priority to German Priority Application No. 102021133882.4, filed Dec. 20, 2021, the disclosure of which is incorporated herein by reference in its entirety.

TECHNICAL FIELD

The disclosure relates to a method and an apparatus for compensating a yaw moment acting on a vehicle during a braking operation.

BACKGROUND

A yaw moment can be generated during a braking operation if asymmetrical braking forces are present. Asymmetrical braking forces are understood to be braking forces that act on one each of the two vehicle wheels of a vehicle axle and do not have the same value, so that there is a braking force difference between the existing braking forces of the vehicle wheels of a vehicle axle. The yaw moment is dependent here on the total braking force difference between the vehicle wheels on one side of the vehicle and those on the other side of the vehicle. As a result, the vehicle begins to lean and becomes unstable as a reaction to the yaw moment during the braking operation.

The value of the yaw moment depends here on the braking force difference and the geometric position of the vehicle tyre or the wheel suspension in relation to the vehicle's centre of gravity or its centre axis. Furthermore, the vehicle behaviour can also be influenced by the axle geometry of the vehicle in question, such as the steering roll radius of the front axle. In any case, a yawing movement of the vehicle is undesirable and should be prevented. For this reason, it is important to prevent or minimize yaw moments during braking.

An asymmetric braking force can be caused both by external influences as well as by vehicle-related influences.

An external influence would be, for example, a road surface that provides a different coefficient of friction for the vehicle wheels on one side than for the vehicle wheels on the other side. Thus, during a braking operation, there could be a braking force difference between the vehicle sides that causes a yaw moment.

Vehicle-related influences can be present, for example, in braking systems that have at least two brakes that are actuated individually, for example electromechanical brakes, especially brake-by-wire brakes.

SUMMARY

What is needed is a method and an apparatus which compensate a yaw moment caused by asymmetrical braking forces and acting on a vehicle, in order to increase vehicle safety during braking operations. Furthermore, it should be possible to implement the apparatus as cost-effectively as possible.

A method for compensating a yaw moment acting on a vehicle, wherein the yaw moment is caused by asymmetrical braking forces on at least one vehicle axle, method comprising:

a) querying at least one vehicle-related condition after initiating a braking operation;
b) detecting a yaw variable present at the vehicle;
c) comparing a value of the detected yaw variable with a yaw variable limit value;
d) determining a corrective steering angle depending on a difference and/or a change in the difference between the value of the detected yaw variable and the yaw variable limit value, taking into account a sign of the yaw variable; and
e) automatically adjusting a corrective steering angle on at least one vehicle wheel of a steered vehicle axle.

The basic concept of the disclosure is to compensate the yaw moment during the braking operation by automatically adjusting a corrective steering angle. Here, the corrective steering angle is the angle by which the vehicle wheel is adjusted so that a lateral force builds up on the vehicle wheel adjusted by the corrective steering angle and results in a moment that acts against the yaw moment and thus results in stabilization of the vehicle.

For this purpose, a yaw variable is detected during the braking operation, on the basis of which a possible yaw of the vehicle can be recognized and quantitatively determined. If the value of the yaw variable is not negligibly large and is outside the tolerance and thus above the predefined yaw variable limit value, the corrective steering angle is determined on the basis of the difference between the value of the detected yaw variable and the yaw variable limit value, wherein large differences also result in large corrective steering angles and small differences are compensated with small corrective steering angles. It is essential here to take into account the sign of the yaw moment acting around the vertical axis of the vehicle in order to adjust the vehicle wheel in such a way that the lateral force building up at the vehicle wheel when the corrective steering angle is applied actually results in a moment against the yaw moment. For example, with a counter-clockwise yaw moment, a corrective steering angle of the vehicle wheel must be in the clockwise direction.

This method ensures that any yaw of the vehicle is automatically compensated and no intervention by the driver is necessary.

In one exemplary arrangement, steps a) to e) are performed continuously by a control system integrated in the vehicle, as long as the braking operation continues and/or as long as the value of the yaw rate exceeds the yaw variable limit value. Thus, during the braking operation, a control takes place continuously in which the corrective steering angle is applied in such a way that the yaw variable drops below the yaw variable limit value. This means that a closed control loop is provided. This has the advantage that a geometry of the vehicle axle (i.e. that of the chassis) does not have to be known exactly, since the control loop continuously corrects the corrective steering angle anyway.

In this way, wear and tear on rubber-elastic components of the wheel guide are also taken into account, as well as changes to the chassis, such as vehicle wheel changes, adapter plates or chassis springs, the replacement of which can, for example, have an influence on the steering roll radius and thus also on the corrective steering angle. So, if there is a change in the chassis geometry, the system can recognize this by the fact that the corrective steering angle has not influenced the yaw variable as desired, and therefore the corrective steering angle must be further adjusted until the value of the yaw variable is below the yaw variable limit value, Furthermore, it is conceivable that the system is self-learning and detects changes in the vehicle behaviour during braking operations and takes these into account by (iteratively) adjusting the determination of the corrective steering angle in step d) depending on the difference between the value of the detected yaw variable and the yaw variable limit value and by storing it accordingly.

Advantageously, the at least one condition in step a) comprises one or more of the following conditions: the steering angle is below a predefined limit steering angle, the brake pedal travel is below a predefined limit value, the brake pedal force is below a predefined limit force, the value of the braking force difference between opposing wheels is above a predefined limit value and all driving safety systems are inactive. It is conceivable here that the method is continued only if the at least one condition in step b) is fulfilled, or, if several conditions are to be fulfilled, these several conditions are fulfilled.

The conditions are intended to ensure that a possible corrective steering angle is only applied during braking operations that are considered to be normal in driving operation, and braking operations that constitute exceptional events, such as emergency braking or skidding and subsequent braking, are excluded. The method is thus used only when the steering angle is low and the vehicle is not cornering.

Furthermore, the brake pedal travel and the brake pedal force should be below a predefined limit value or a limit force so that, for example, emergency braking is recognized and the method is not active for braking operations for which the brake pedal travel and brake pedal force are outside the usual values.

In addition, the method is optionally only used when there is a certain braking force difference between opposing vehicle wheels that is above a predefined limit value, since the yaw moment that arises can be ignored when braking force differences are small.

Lastly, the at least one condition may also require that no driving safety system is active, such as an anti-lock braking system.

The at least one condition is therefore intended to ensure that intervention in the steering only takes place if the braking operation is within certain limits at which the corrective steering angle can be determined reliably.

The yaw variable in step c) can be the yaw rate and/or the yaw moment.

The yaw rate provides information here regarding the angular velocity of the vehicle about its own vertical axis, thus it can be concluded from this with which dynamics the vehicle executes the yaw movement, and on the basis of this the corrective steering angle can be transferred to the vehicle wheel quickly or slowly accordingly.

Detecting the yaw moment has the advantage that the variable constituted by the yaw moment can be used to directly infer what lateral force is needed to compensate the yaw moment, so that the corrective steering angle can be determined quickly and easily.

The yaw rate can be determined by a yaw rate sensor and/or the yaw moment can be determined on the basis of the braking forces. Since the yaw rate sensor is usually installed in the vehicle anyway, as the yaw rate is often required for driving safety systems, there is no additional effort and no additional cost. Furthermore, the yaw moment can be estimated easily and sufficiently accurately from the braking forces acting on the vehicle wheels, so that a representative yaw moment can be determined.

Advantageously, the braking forces can be determined via the position of the wheel brake actuators and/or clamping force sensors on the brakes.

In the case of electromechanical brakes, the position of the wheel brake actuator is typically known anyway, and therefore the clamping force that the wheel brake actuator applies to the brake disc via the brake pad can be inferred, from which the circumferential force generated at the brake disc can be derived. From this, in turn, the effective braking force between the vehicle wheel and the road can be deduced (taking into account the ratio of the mean brake disc radius to the dynamic tyre radius).

Clamping force sensors on the brakes also allow a conclusion to be drawn about the damping force generated by the wheel brake actuator and acting on the brake pad and the brake disc, which allows the effective braking force between the vehicle wheel and the road to be determined during the braking operation.

In addition, it is also conceivable that in electromechanical braking systems, the current consumption of the electric wheel brake actuator can be used to determine how high the applied clamping force is. In this case, no further component is necessary to detect the clamping force.

In one exemplary arrangement, the corrective steering angle is reduced in step e) if the value of the yaw variable in step d) is below the yaw variable limit value. This means that there is no longer any active intervention once the vehicle is in a stable driving state and the corrective steering angle is automatically reduced.

Furthermore, after the corrective steering angle has been determined and adjusted once in steps d) and e), the corrective steering angle can be determined in the second run-through of the method, performed by the control system integrated in the vehicle, based on the change in the difference between the value of the detected variable and the yaw variable limit value. Thus, in step d), in each subsequent run-through of the method, the current difference is compared with the previous difference and the corrective steering angle is adjusted on the basis thereon. It is therefore possible to judge from the change whether the previously set corrective steering angle results in the desired reduction in the value of the yaw variable, and the corrective steering angle can already be decreased if the difference between the value of the yaw variable and the yaw variable limit value has decreased significantly, or the corrective steering angle can be maintained or increased if no change or even an increase in the difference can be detected.

In one exemplary arrangement, the corrective steering angle can be determined in step d) (in advance) mathematically using a formula or using empirical data in the form of stored curves, matrices or tables and/or iteratively using the change in the difference determined in step e). The determination of the corrective steering angle using a formula is suitable if the chassis geometry is known and it is ensured that these only change negligibly. It is thus possible to quickly determine a suitable corrective steering angle and it is ensured that the desired stabilization of the vehicle is hereby achieved.

The same applies to the determination of the corrective steering angle on the basis of empirical data, which can be collected, for example, during the testing process or also in everyday driving operation. However, it is conceivable that these empirical data are collected again and again depending on the operating time, the mileage, or a certain period of time in order to take into account changes to the vehicle, for example due to wear or replacement of components. The stored curves, matrices or tables allow quick access here to the required data, which is used to set the corrective steering angle.

The iterative determination of the corrective steering angle on the basis of the change of the determined difference has an advantage that a closed control loop is provided, so that no vehicle-specific data, such as the chassis geometry, need to be known, since the method automatically adjusts the corrective steering angle in such a way that the yaw variable drops below the yaw variable limit value.

In one exemplary arrangement, in step d), a corrective steering angle is applied to each of two vehicle wheels of the steered vehicle axle. In this way, both wheels simultaneously apply a lateral force that counteracts the yaw moment created during the braking operation, whereby the corrective steering angle can be selected smaller and the loads for each vehicle wheel are reduced.

Vehicle wheels of the steered vehicle axle can be adjusted purely electrically or by a superimposed steering system.

Electric adjustment has the advantage that the wheels can be adjusted completely independently of the steering wheel and also different corrective steering angles can be applied to the wheels independently of each other. The driver does not notice any intervention at the steering wheel.

With a superimposed steering system, it is ensured that both wheels are moved synchronously to each other when the steering rod is adjusted and yet a corrective steering angle can be applied without this being perceived by the driver at the steering wheel.

Furthermore, an apparatus for carrying out the method according to the disclosure, for compensating a yaw moment acting on a vehicle, having a braking system, a sensor device for detecting a yaw variable, at least one further sensor for detecting vehicle-related data, at least one steered vehicle axle with a vehicle wheel, wherein the vehicle wheel is adjustable by a superimposed steering system and/or with an electric motor, and a control system which is integrated in the vehicle and which is set up to continuously query conditions on the basis of the determined vehicle-related data and to compare a difference between the detected yaw variable and a yaw variable limit value is disclosed. The control system determines a corrective steering angle depending thereon and fixing the steering angle of the vehicle wheel of the steered vehicle axle to the corrective steering angle.

This apparatus can be easily implemented, especially in modern steering systems, since the components and parts required anyway are largely installed as standard. The advantages additionally resulting can be seen in the paragraphs above.

The braking system can comprise at least two individual independent brakes with electric wheel brake actuators. The electric wheel brake actuators allow, as already described in the above paragraphs, a simple determination of the braking forces present at the vehicle wheels by determining the position of the wheel brake actuators and/or the current consumption of the electric wheel brake actuators.

The sensor device can comprise a yaw rate sensor to detect the yaw rate and/or a travel sensor to determine the position of the wheel brake actuators by which the braking force at each vehicle wheel can be estimated and/or a clamping force sensor on each brake to determine the braking force at each vehicle wheel.

The yaw rate sensor is a simple and cost-effective component that is usually installed in the vehicle anyway.

The travel sensor is installed in electric wheel brake actuators anyway in order to be able to reliably determine their position, and represents a cost-effective component via which the yaw moment acting on the vehicle can be estimated with sufficient accuracy on the basis of the braking force at each vehicle wheel.

Using the clamping force sensor, the braking force at each vehicle wheel can be determined precisely, which has a positive effect on the determination of the yaw moment.

The at least one sensor for acquiring vehicle-related data can include a steering angle sensor and/or a travel sensor for measuring brake pedal travel and/or a force sensor for measuring brake pedal force and/or sensors for determining the value of the braking force difference between opposing wheels.

The advantages resulting from this arrangement can be seen in the paragraphs above.

In one exemplary arrangement, the steered vehicle axle can be a front axle with two vehicle wheels. This arrangement is suitable for a so-called steer-by-wire steering system, in which the vehicle wheels of the steered vehicle axle can be adjusted individually and independently of the steering wheel angle applied to the steering wheel. In addition, an adjustment of the vehicle wheels on the steered front axle is, in practice, hardly or only slightly noticed by the vehicle occupants, so that there is no loss of comfort. This applies to the method and apparatus according to the disclosure.

BRIEF DESCRIPTION OF DRAWINGS

The disclosure is described below with reference to various exemplary arrangements illustrated in the accompanying drawings. In the figures.

DETAILED DESCRIPTION

Figure 1:
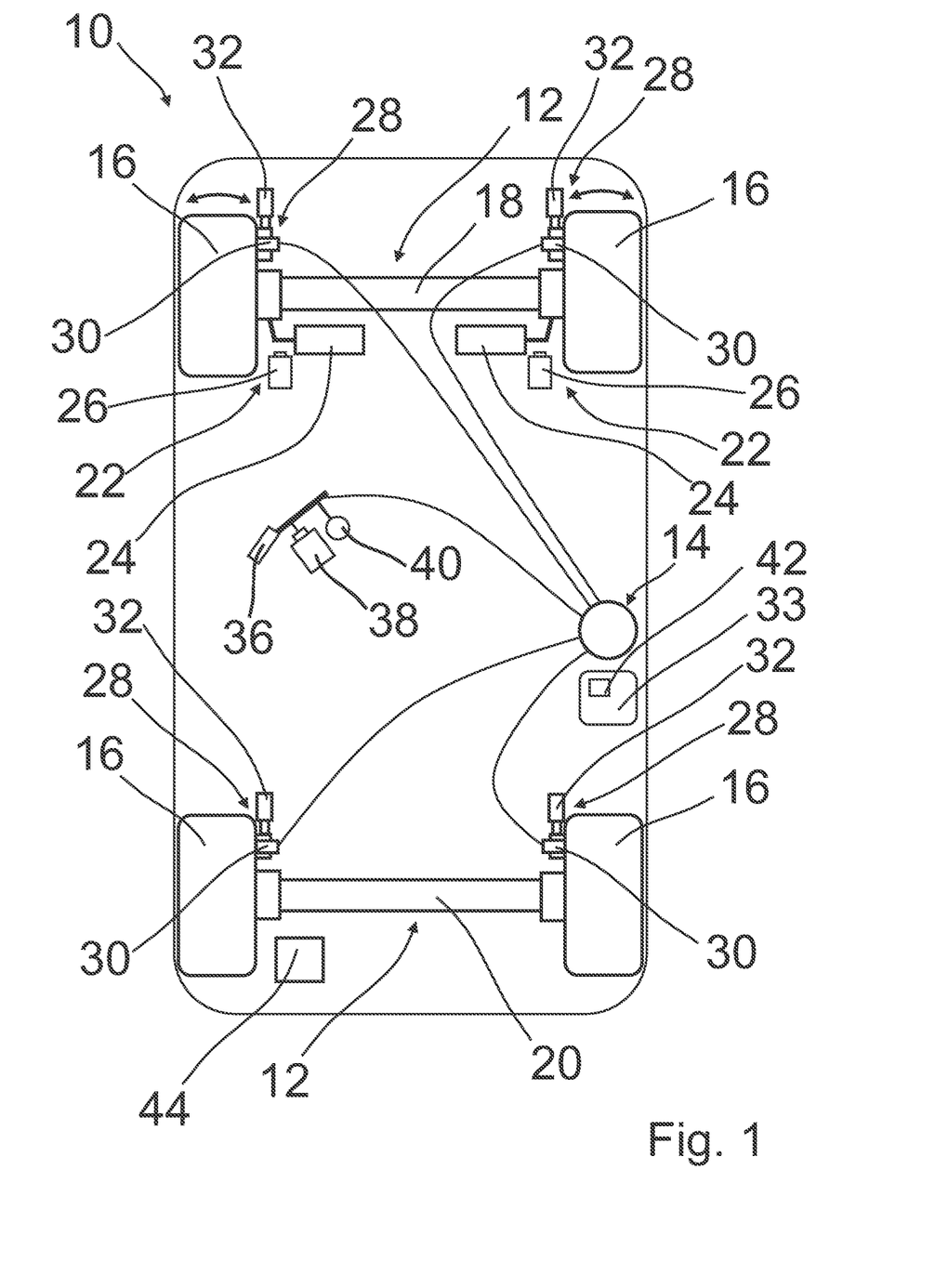
FIG. 1 shows a schematic drawing of a vehicle equipped with the apparatus according to the disclosure in plan view, representative of various exemplary arrangements by which the method according to the disclosure is carried out.

FIG. 1 shows a vehicle 10 with two vehicle axles 12 and a braking system 14 as part of an apparatus for compensating a yaw moment.

The two vehicle axles 12 each have two vehicle wheels 16 and are divided into a steered front axle 18, which forms a front axle, and an unsteered vehicle axle 20, which forms a rear axle.

According to a further exemplary variant, it is also conceivable that the steered vehicle axle forms the rear axle, and the unsteered vehicle axle 20 forms the front axle.

Furthermore, an exemplary variant is also possible in which both the front axle and the rear axle form a steered vehicle axle 18.

The steered front axle 18 comprises a steering system 22 by which a steering angle can be applied to the vehicle wheels 16 of the steered front axle 18.

The steering system 22 is, for example, a so-called steer-by-wire steering system comprising two electric motors 24 by which the vehicle wheels 16 of the steered vehicle axle 18 can each be individually adjusted.

The steering system 22 additionally comprises steering angle sensors 26 which can be used to detect the steering angles of the two vehicle wheels 16.

According to a further option, it is also possible for the steer-by-wire steering system to comprise only one electric motor, which adjusts both vehicle wheels 16 of the steered front axle 18 simultaneously, for example via a toothed rack.

According to a third option, the steering system 22 can also be a superimposed steering system, which enables driver-independent steering interventions, for example if the superimposed steering system comprises a harmonic gearing.

The braking system 14 of the vehicle 10 comprises four, for example electromechanical brakes 28, the wheel brake actuators 30 of which can be adjusted electrically, so that all vehicle wheels 16 can be individually braked via the braking system 14. Thus, the braking system 14 can be a brake-by-wire system.

In addition, the braking system 14 comprises travel sensors 32 on each brake 28 to enable the position of the electric wheel brake actuators 30 to be determined.

In addition, or instead of the travel sensors 32, the braking system 14 comprises clamping force sensors 34 that are used to determine the force applied by the electric wheel brake actuator 30 at each brake 28.

The brakes 28 of the braking system 14 are actuated by the driver via a brake pedal 36.

A force sensor 38 is provided on the brake pedal 36 and is used to detect the brake pedal force applied by the driver.

Furthermore, a travel sensor 40 is arranged on the brake pedal and is used to determine the brake pedal travel.

The aforementioned sensor device 33 can comprise, in addition to the travel sensor 32 and the clamping force sensor 34, or instead of these sensors, a yaw rate sensor 42, which is used to determine the yaw rate present when the vehicle 10 is yawing.

The sensors 26, 32, 34, 38, 40, 42 and the sensor device 33 are part of the aforementioned apparatus.

Furthermore, the apparatus comprises a control system 44 integrated in the vehicle. The controller 44 integrated in the vehicle is coupled here to the sensors 26, 32, 34, 38, 40, 42. Further, the control system 44 integrated in the vehicle is also coupled to the sensor device 33 as well as to the electric motors 24 and the electric wheel brake actuators 30.

A method for compensating the yaw moment using the apparatus is explained below with reference to FIGS. 2-5.

Figure 2:
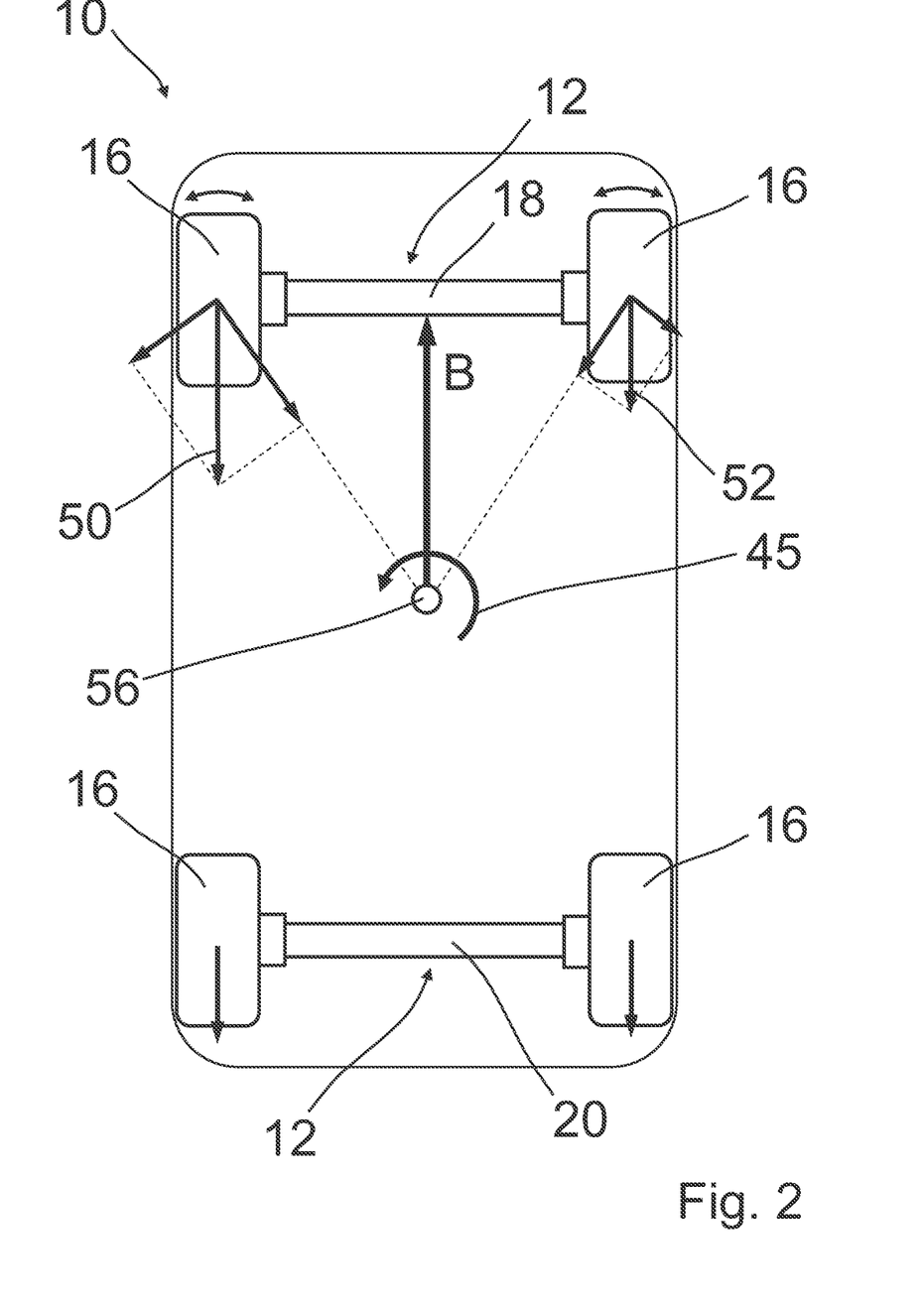
FIG. 2 shows a schematic drawing of the vehicle in plan view during a braking operation.
Figure 3:
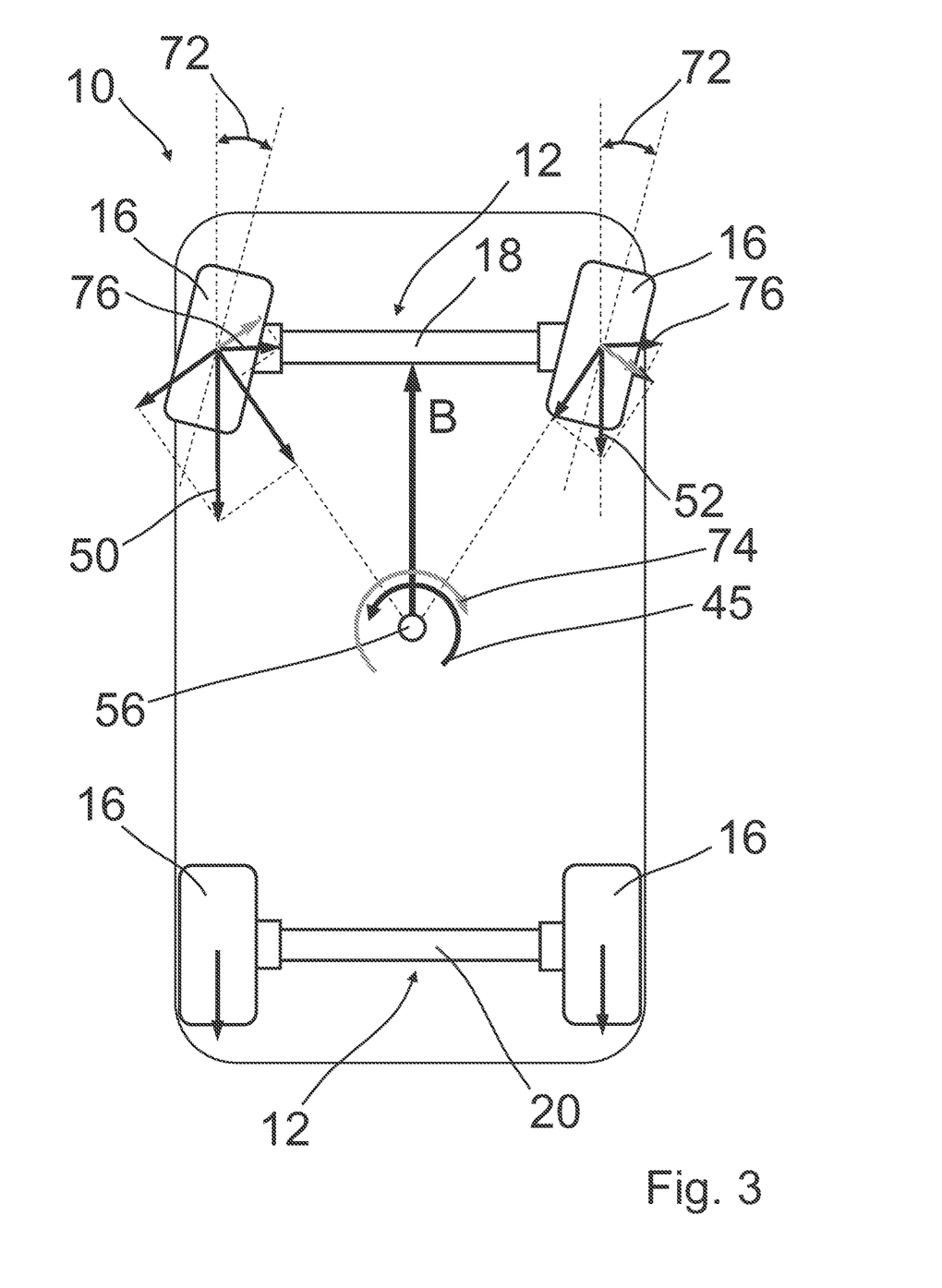
FIG. 3 shows a schematic drawing of the vehicle in plan view during the braking operation, in which a corrective steering angle is applied to vehicle wheels.

In order to improve clarity, FIGS. 2 to 3 largely do not show the components and parts explained above.

A yaw moment 45 during braking operations when driving straight ahead can occur when there are asymmetrical braking forces 50, 52 at one vehicle axle, so that the braking forces are unequal and there is a braking force difference (see FIG. 2).

For example, there can be a braking force 50 at the left vehicle wheel 16 of the front axle that is greater than the braking force 52 that is present at the right vehicle wheel 16 of the front axle. This results in a braking force difference at the front axle 18, wherein both braking forces have the same lever arm in relation to the vehicle centre of gravity 56. There is no torque compensation, and therefore a yaw moment 45 is created. This causes the vehicle 10 to yaw, which is induced by the yaw moment 45 (see FIGS. 2 and 3).

In a first step of the method, the vehicle-related conditions are queried. Here it is ensured that the steering angle of the two vehicle wheels 16 of the steered vehicle axle 18 is below a predefined limit angle. In addition, it is checked whether the brake pedal travel of the brake pedal 36 recorded by the travel sensor 40 is below a predefined limit value and the brake pedal force recorded by the force sensor 38 is below a predefined limit force. This means that there is no emergency braking or very heavy braking. Optionally, the value of the braking force difference between two opposing vehicle wheels, i.e. two vehicle wheels 16 arranged on a vehicle axle 12, can also be determined and it can be checked whether this is above a predefined limit value.

These vehicle-related conditions are intended to ensure that the method is only carried out when the vehicle is travelling approximately in a straight line and the braking operation itself represents a typical braking operation in normal operation, with neither an overall very high nor an overall very low braking force.

In the next step of the method, the yaw variable present in the vehicle 10 is detected.

According to a first exemplary arrangement of the method, the yaw variable is the yaw rate of the vehicle, which is detected by the yaw rate sensor 42 of the sensor device 33.

According to a further exemplary arrangement, the yaw variable is the yaw moment present, which is determined on the basis of the braking forces present at the vehicle wheels 16.

Figure 4:
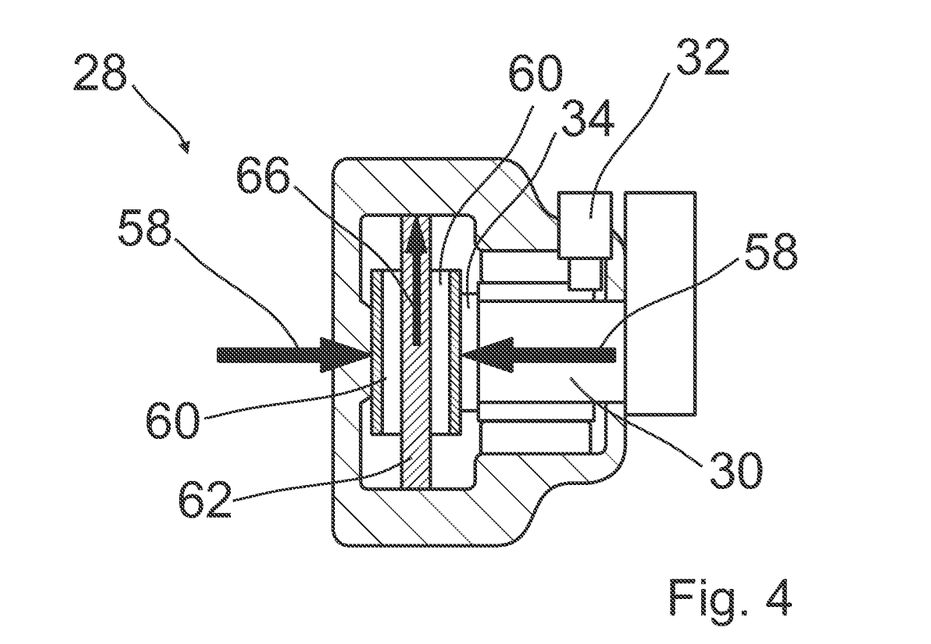
FIG. 4 shows a schematic detailed view of a brake in section.
Figure 5:
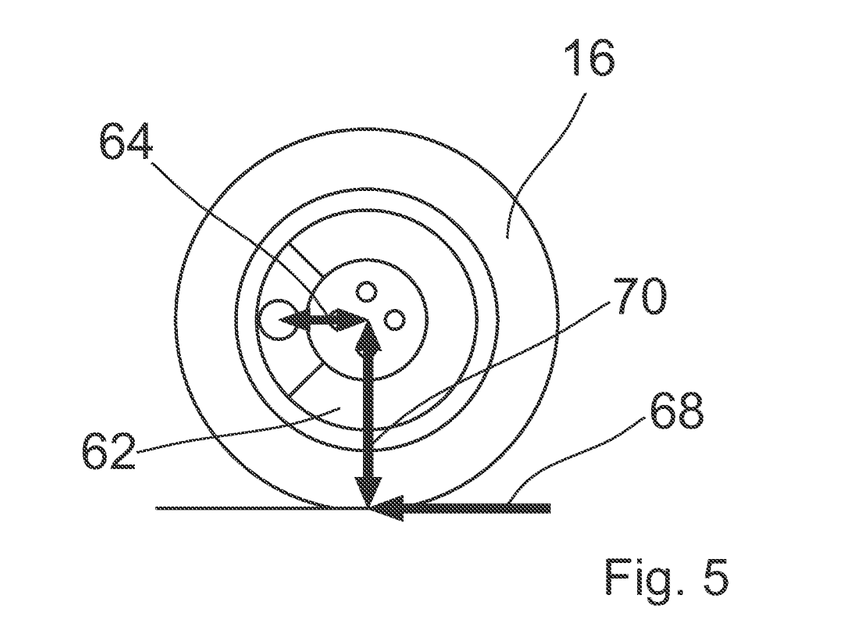
FIG. 5 shows a schematic detailed view of a vehicle wheel during a braking operation.

The determination of the braking forces at all four vehicle wheels 16 can be carried out according to different exemplary variants, which are explained below with reference to FIGS. 4 and 5. All of these variants are based on determining a clamping force 58 which us applied by the electric wheel brake actuator 30 and with which brake pads 60 press on a brake disc 62. The clamping force 58 and the coefficient of friction present between the brake pads 60 and the brake disc 62 can be used to determine the circumferential force 66 acting on the effective brake disc radius 64. Subsequently, a braking force 78 acting between the vehicle wheel 16 and the road surface can be concluded via the product of the circumferential force 66 with the ratio of the effective brake disc radius 64 and a dynamic tyre radius 70.

According to a first exemplary variant, the determination of the braking force 68 via the clamping force 58 is carried out by the clamping force sensors 34, which are arranged on the brakes 28.

According to a second exemplary variant, the clamping force is determined via the position of the wheel brake actuators 30, which is detected by the travel sensors 32.

According to a further exemplary variant, the current consumption of the individual electric wheel brake actuators 30 is used to infer the clamping force 58 generated, from which the braking force 68 can be derived.

If the yaw rate is known in the form of the yaw rate and/or the yaw moment, the next step of the method is to compare the value of the detected yaw rate(s) with (in each case) a predefined, stored yaw variable limit value. This (in each case one) yaw variable limit value represents a value below which a yaw variable is negligible and above which a yaw variable must be compensated by the method.

A corrective steering angle 72 is determined on the basis of the difference between the value of the detected yaw variable(s) and the yaw variable limit value. The direction of rotation of the yaw moment 45 is also taken into account. The corrective steering angle 72 can be determined mathematically using a formula with a known chassis geometry and known braking forces 68.

The corrective steering angle 72 refers here to the steering angle of both vehicle wheels 16 of the steered vehicle axle 18 (here front axle). By applying a corrective steering angle 72 to the vehicle wheels, a lateral force 76 is generated at each of the two vehicle wheels 16 and results in a compensating torque 74 that counteracts the yaw moment 45. This has the effect of decreasing the value of the yaw variable and stabilizing the vehicle 10.

Alternatively, the corrective steering angle 72 can also be determined on the basis of empirical data which, for example, was collected during the testing process and is available in the form of stored curves, matrices or tables. In this data, the control system 44 integrated in the vehicle seeks out a braking operation that is similar to the present one, so that the corrective steering angle 72 can be set analogously to that of the empirical data.

Lastly, it is also possible to first determine the corrective steering angle 72 mathematically and/or on the basis of the empirical data and then to determine it iteratively depending on the change in the determined difference between the yaw variable and the yaw variable limit value. The corrective steering angle 72 is continuously adjusted via such a closed control loop.

In all of these approaches, the corrective steering angle 72 is cancelled as soon as the value of the yaw variable falls below the yaw variable limit value, indicating that the vehicle 10 has returned to a stable driving state.

With the corrective steering angle 72 present, the vehicle wheels 16 on the steered front axle 18 are adjusted by the control system 44 integrated in the vehicle, which is coupled to the steering system 22.

In addition, the steering angle is adjusted via the two electric motors 24.

The invention claimed is:

1. A method for compensating a yaw moment acting on a vehicle,
the yaw moment being caused by asymmetrical braking forces on at least one vehicle axle, the method comprising the steps of:
a) querying at least one vehicle-related condition after initiating a braking operation;
b) detecting a yaw variable present at the vehicle;
c) comparing a value of the detected yaw variable with a yaw variable limit value;
d) determining a corrective steering angle depending on a difference and/or a change in the difference between the value of the detected yaw variable and the yaw variable limit value, taking into account a sign of the yaw variable; and
e) automatically adjusting a corrective steering angle on at least one vehicle wheel of a steered vehicle axle;
wherein the yaw variable is a yaw rate and/or a yaw moment.

2. The method according to claim 1, wherein that steps a) to e) are performed continuously by a control system integrated in the vehicle as long as the braking operation continues and/or as long as a value of the yaw variable exceeds that of the yaw variable limit value.

3. The method according to claim 2, wherein the at least one condition in step a) comprises one or more of the following conditions: a steering angle is below a predefined limit steering angle, a brake pedal travel is below a predefined limit value, a brake pedal force is below a predefined limit force, a value of a braking force difference between opposing vehicle wheels is above a predefined limit and all driving safety systems are inactive.

4. The method according to claim 3, wherein the corrective steering angle is cancelled in step e) if the value of the yaw variable in step d) is below that of the yaw variable limit value.

5. The method according to claim 4, wherein the corrective steering angle is determined in step d) by calculation using a formula or using empirical data in the form of stored curves, matrices or tables and/or iteratively using a change in a difference determined in step e).

6. The method according to claim 5, wherein in step d) a corrective steering angle is applied to each of two vehicle wheels of the steered vehicle axle.

7. The method according to claim 1, wherein the at least one condition in step a) comprises one or more of the following conditions: a steering angle is below a predefined limit steering angle, a brake pedal travel is below a predefined limit value, a brake pedal force is below a predefined limit force, a value of a braking force difference between opposing vehicle wheels is above a predefined limit, and all driving safety systems are inactive.

8. The method according to claim 1, wherein the yaw rate is determined via a yaw rate sensor and/or the yaw moment is determined on the basis of the braking forces.

9. The method according to claim 8, wherein the braking forces are determined via the position of the wheel brake actuators and/or clamping force sensors on brakes.

10. The method according to claim 1, wherein the corrective steering angle is cancelled in step e) if the value of the yaw variable in step d) is below that of the yaw variable limit value.

11. The method according to claim 1, wherein the corrective steering angle is determined in step d) by calculation using a formula or using empirical data in the form of stored curves, matrices or tables and/or iteratively using a change in a difference determined in step e).

12. The method according to claim 1, wherein in step d) a corrective steering angle is applied to each of two vehicle wheels of the steered vehicle axle.

13. An apparatus for compensating for a yaw moment acting on a vehicle and for carrying out the method according to claim 1, the apparatus comprising a braking system, a sensor device for sensing a yaw variable, at least one further sensor for sensing vehicle-related data, at least one steered vehicle axle with a vehicle wheel, wherein the vehicle wheel is adjustable by a superimposed steering system and/or with an electric motor, and a vehicle-integrated controller which is set up to continuously query conditions on the basis of the sensed vehicle-related data and to compare between the detected yaw variable and a yaw variable limit value, wherein the controller determines a corrective steering angle depending on the comparison between the detected yaw variable and the yaw variable limit value and fixes the steering angle of the vehicle wheel of the steered vehicle axle to the corrective steering angle.

14. The apparatus according to claim 13, wherein the braking system comprises at least two individual independent brakes with electric wheel brake actuators.

15. The apparatus according to claim 14, wherein the sensor device comprises a yaw rate sensor for detecting the yaw rate and/or a travel sensor for determining the position of the wheel brake actuators by which a braking force at each vehicle wheel can be estimated and/or a clamping force sensor at each brake to determine the braking force at each vehicle wheel.

16. The apparatus according to claim 15, wherein the at least one sensor for detecting vehicle-related data comprises a steering angle sensor and/or a travel sensor for measuring brake pedal travel and/or a force sensor for measuring brake pedal force and/or sensors for determining the value of the braking force difference between opposing vehicle wheels.

17. The apparatus according to one of claim 13, wherein the at least one sensor for sensing vehicle-related data comprises a steering angle sensor and/or a travel sensor for measuring brake pedal travel and/or a force sensor for measuring brake pedal force and/or sensors for determining the value of the braking force difference between opposing vehicle wheels.

* * * * *